E. C. HIGGINS.
PROCESS OF EXTRACTING TIN.
APPLICATION FILED DEC. 14, 1907.
902,581.
Patented Nov. 3, 1908.
2 SHEETS—SHEET 1.
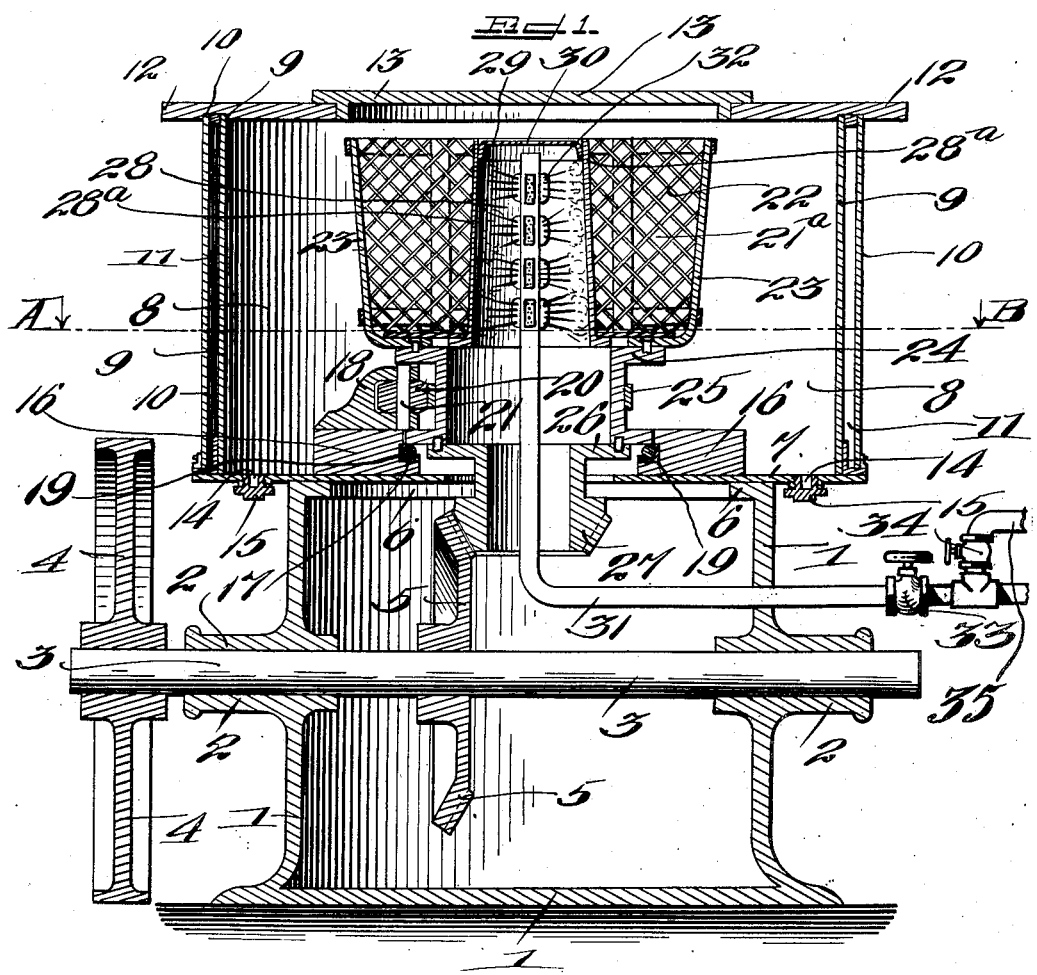
Witnesses:
C. L. Ashley
F. W. Ashley
Inventor
Emerson C. Higgins
By his Attorneys
Mattick & Towns

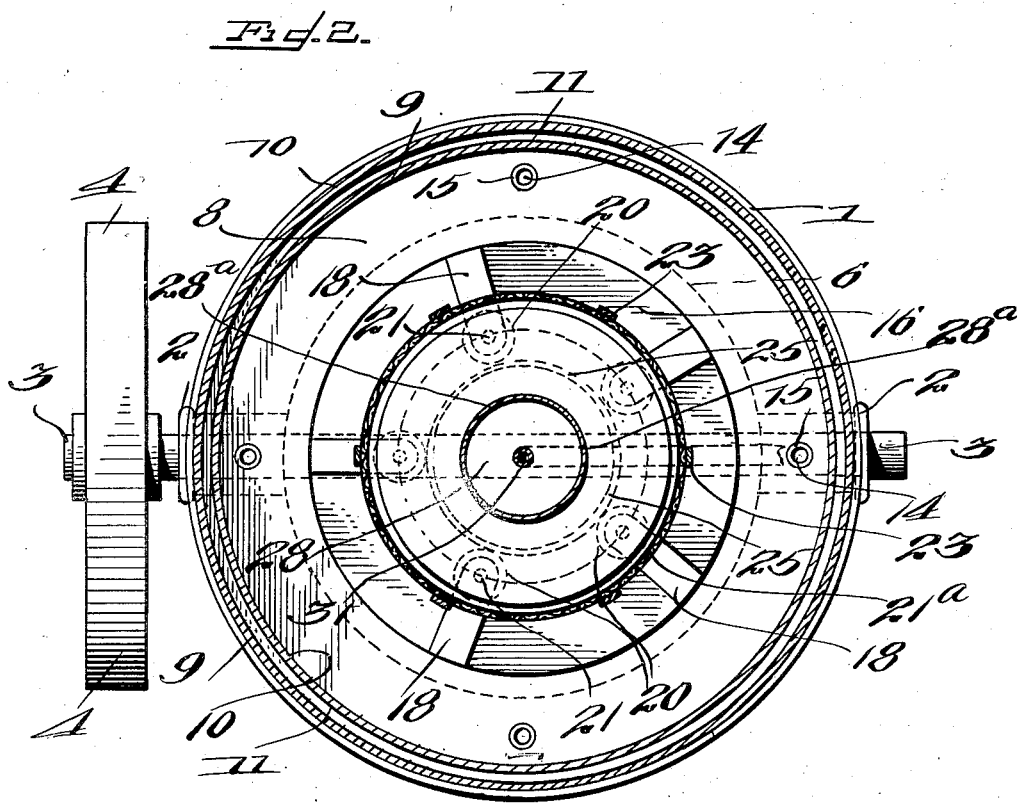

UNITED STATES PATENT OFFICE.

EMERSON C. HIGGINS, OF BAYONNE, NEW JERSEY.

PROCESS OF EXTRACTING TIN.

No. 902,581.  Specification of Letters Patent.  Patented Nov. 3, 1908.

Application filed December 14, 1907. Serial No. 406,477.

*To all whom it may concern:*

Be it known that I, EMERSON C. HIGGINS, a citizen of the United States, residing at Bayonne, in the county of Hudson and State of New Jersey, have invented a certain new and useful Process of Extracting Tin, of which the following is a specification.

This invention relates to a new and useful process of extracting tin from tin scraps, such as old tin cans for example, and has for its object a simple and economical means for accomplishing the result.

In the following I have described, in connection with the accompanying drawings, one means of practicing my process, the features thereof being more particularly pointed out hereinafter in the claims.

In the drawings Figure 1 is a vertical sectional elevation of one form of apparatus for practicing my process and Fig. 2 is a cross sectional plan view of the same along the line A—B of Fig. 1 looking in the direction of the arrows.

Similar numerals of reference indicate similar parts throughout the several views.

1 represents a base or standard of any suitable material, preferably cast iron having air openings (not shown) in its sides and provided with bearings 2—2 for a shaft 3. A pulley 4, adapted to be driven by any suitable means, is mounted on one end of shaft 3. A gear wheel 5 is mounted on shaft 3 intermediate bearings 2—2. Base 1 is provided with a centrally apertured table or top 6 adapted to form a support for a centrally apertured plate 7 forming the bottom of a receptacle 8 which latter is preferably circular in form and made from plates 9 and 10 so disposed as to form a jacket having an air space 11 between them. Receptacle 8 is provided with a removable cover 12 centrally apertured, said aperture being adapted to be closed by a door 13. Outlets 14 closed by screw plugs 15 are suitably disposed in the bottom plate 7 of receptacle 8. A ring 16 forming a seat for ball bearings 17 and a support for bearing blocks 18 rests on plate 7. Steel strips 19 form a bearing surface for ball bearings 17. Bearing blocks 18 each carry a wheel 20 turning on a shaft 21. A basket 21$^a$, preferably formed of metallic strips 22 and strengthened by reinforcing strips 23—23 is bolted or otherwise firmly fastened to a ring 24, provided with a track 25 bearing against wheels 20. Ring 24 rests upon ball bearings 17 and is bolted or otherwise firmly fastened to plate 26 carrying gear 27 adapted to mesh with gear 5 on shaft 3. Basket 21$^a$ is provided with a preferably centrally located conical space 28 having preferably imperforate walls 28$^a$ and a cover 29 provided with an aperture 30. A pipe 31, provided with a plurality of burners 32 is adapted to conduct gas and air under pressure from any suitable source (not shown) into space 28. Valve 33 controls gas pipe 31 and valve 34 controls air pipe 35, the combustible mixture of gas and air being thus controlled as desired.

The operation of the foregoing means illustrating one way of carrying out my process is as follows: door 13 being open tin scraps are dumped into basket 21$^a$ and door 13 closed. Pulley 4 is then caused to turn, rotating shaft 3 carrying gear 5, meshing with gear 27 and thus rotating basket 21$^a$. Valves 33 and 34 are then opened and the gas is ignited, the radiating heat of the same melting the tin, the flames themselves not coming into contact with the tin scraps. I have found that gas and air under a pressure of approximately five pounds and a speed of rotation of the basket of approximately 800 revolutions a minute are sufficient to raise the temperature enough to melt the tin from the scraps and to cause the same immediately that it is melted to be thrown by centrifugal force through the meshes of basket 21 and into receptacle 8 against inner wall or plate 9. Plate 9 being at a temperature below the melting point of tin, the tin solidifies in the shape of fine scales. When sufficient is accumulated in the receptacle, cover 12 is removed and the tin is scraped off wall or plate 9 and discharged through outlets 14. The tin thus melted and recovered is not oxidized as the heat is only sufficient to melt the tin and the tin is thrown off immediately that it is melted.

It is obvious that other means than that hereinabove described may be utilized in practicing the process without departing from the spirit and scope of the invention. Furthermore the process may be used for melting other metals than tin as specifically set forth and where I use the word "tin" in the claims I mean to include such other purposes. I do not restrict myself to the details set forth nor to the specific uses described.

What I claim and desire to secure by Letters Patent is:—

1. The process of removing tin from tin scraps consisting in melting the tin without permitting the flame to contact with the scraps and throwing off the melted tin by centrifugal force.

2. The process of removing tin from tin scraps consisting of melting the tin by radiated heat without permitting the flame to contact with the scraps and throwing off the melted tin by centrifugal force.

3. The process of removing tin from tin scraps without oxidizing the same consisting in subjecting the scraps to heat at a temperature just sufficient to melt the tin but without permitting the flame to contact with the scraps and throwing off the tin, immediately it is melted, by centrifugal force.

4. The process of removing tin from tin scraps consisting in subjecting the tin scraps to the effect of radiated heat applied at approximately the center of the mass and at a temperature sufficient to melt the tin and throwing off the melted tin by centrifugal force immediately that it is melted.

5. The process of manufacturing tin from tin scraps consisting in melting the tin without permitting the flame to contact with the scraps and throwing off the melted tin in a substantially horizontal plane by centrifugal force.

In testimony whereof I have hereunto signed my name in the presence of two subscribing witnesses.

EMERSON C. HIGGINS.

Witnesses:
SEABURY C. MASTICK,
K. G. LE ARD.